United States Patent
Das et al.

(10) Patent No.: US 12,187,327 B2
(45) Date of Patent: Jan. 7, 2025

(54) FUEL CONTROL SYSTEM

(71) Applicant: Transportation IP Holdings, LLC, Norwalk, CT (US)

(72) Inventors: Sumit Das, Bengaluru (IN); Somnath Barole, Bengaluru (IN); Vishram Nandedkar, Bengaluru (IN); Padmaprabha Subbaraj, Bengaluru (IN)

(73) Assignee: Transportation IP Holdings, LLC, Norwalk, CT (US)

( * ) Notice: Subject to any disclaimer, the term of this patent is extended or adjusted under 35 U.S.C. 154(b) by 552 days.

(21) Appl. No.: 17/485,667

(22) Filed: Sep. 27, 2021

(65) Prior Publication Data
US 2022/0010743 A1 Jan. 13, 2022

Related U.S. Application Data

(63) Continuation-in-part of application No. 16/437,970, filed on Jun. 11, 2019, now Pat. No. 11,143,133.

(51) Int. Cl.
*B61C 15/14* (2006.01)
*B61C 17/12* (2006.01)
(Continued)

(52) U.S. Cl.
CPC ............ *B61C 15/14* (2013.01); *B61C 17/12* (2013.01); *F02D 41/1401* (2013.01);
(Continued)

(58) Field of Classification Search
CPC ...... B60W 2050/0039; B60W 2720/40; B60Y 2200/31; B60Y 2300/188; B60Y 2300/43;
(Continued)

(56) References Cited

U.S. PATENT DOCUMENTS 5,568,390 A * 10/1996 Hirota .............. G08G 1/096827
340/995.13
6,473,720 B1 10/2002 Hampson
(Continued)

FOREIGN PATENT DOCUMENTS

CN 115875149 A 3/2023
WO WO-2008073546 A2 * 6/2008 ............ B61C 17/12

*Primary Examiner* — Hung Q Nguyen
*Assistant Examiner* — Mark L. Greene
(74) *Attorney, Agent, or Firm* — K&L Gates LLP (57) ABSTRACT

A fuel control system obtains a measured amount of fuel consumed by an engine and one or more corresponding operating parameters of the engine and determines a fuel consumption modeled amount based at least in part on a fuel consumption model of the engine and the one or more operating parameters. The fuel consumption model associates different amounts of fuel that, when supplied to the engine, generate corresponding designated outputs of the engine. The system also determines one or more differentials between the measured amount of fuel and the modeled amount and, responsive to the one or more of the differentials exceeding a threshold value, the system identifies one or more components of the powered system that contribute or cause the one or more differentials and/or changes an amount of fuel supplied to the engine according to the fuel consumption model to obtain a desired output of the engine.

19 Claims, 1 Drawing Sheet

(51) Int. Cl.
*F02D 41/14* (2006.01)
*F02D 41/22* (2006.01)
*G01M 15/04* (2006.01)
*G05D 1/00* (2006.01)
*B60W 50/00* (2006.01)
*G07C 5/00* (2006.01)

(52) U.S. Cl.
CPC ........... *F02D 41/22* (2013.01); *G01M 15/042* (2013.01); *G05D 1/0027* (2013.01); *B60W 2050/0039* (2013.01); *B60Y 2200/31* (2013.01); *B60Y 2300/188* (2013.01); *B60Y 2300/43* (2013.01); *B60Y 2300/52* (2013.01); *B60Y 2306/15* (2013.01); *B60Y 2400/202* (2013.01); *F02D 2041/1433* (2013.01); *F02D 2041/225* (2013.01); *F02D 2200/0625* (2013.01); *F02D 2200/701* (2013.01); *G07C 5/006* (2013.01)

(58) Field of Classification Search
CPC ............ B60Y 2300/52; B60Y 2306/15; B60Y 2400/202; B61C 15/14; B61C 17/12; B62D 53/005; F02D 41/1401; F02D 41/22; F02D 41/3005; F02D 2041/1433; F02D 2041/225; F02D 2200/021; F02D 2200/0404
See application file for complete search history.

(56) References Cited

U.S. PATENT DOCUMENTS

| | | | |
|---|---|---|---|
| 6,539,783 | B1 | 4/2003 | Adibhatla |
| 7,739,004 | B2 | 6/2010 | Johnson |
| 8,204,672 | B2* | 6/2012 | Mylaraswamy ....... G06Q 10/06 261/50.1 |
| 8,924,052 | B2* | 12/2014 | Melas ................... B61C 17/12 701/19 |
| 11,143,133 | B2 | 10/2021 | Das et al. |
| 2017/0159574 | A1 | 6/2017 | Paul et al. |
| 2019/0032509 | A1 | 1/2019 | Muldal et al. |

* cited by examiner

FUEL CONTROL SYSTEM

CROSS-REFERENCE TO RELATED APPLICATION

This application is a continuation-in-part of U.S. patent application Ser. No. 16/437,970, which was filed on 11 Jun. 2019, and the entire disclosure of which is incorporated herein by reference.

BACKGROUND

Technical Field

The inventive subject matter described herein relates to controlling fuel supplied to powered systems.

State of the Art

Powered systems having engines can change how much fuel is consumed over time. For example, conditions such as leaks in vehicle cooling systems, leaks in vehicle lubrication systems, increases in manifold air temperatures, etc., may occur. These conditions can increase the amount of fuel that is consumed by the engines. For example, these conditions can reduce the propulsion or thrust generated by engines of the vehicles and operators of the vehicles may run the vehicles in states that consume more fuel to maintain propulsion or thrust.

Monitoring fuel usage of a vehicle can indicate that a condition exists that is increasing the amount of fuel consumed by the vehicle. The amount of fuel consumed to complete a trip can be compared with prior amounts of fuel consumed to complete the same trip. Increases in fuel consumption can indicate that a condition exists that is increasing the amount of fuel consumed by the vehicle.

While the increased fuel consumption may be detected, the cause of the increased fuel consumption may not be easily or readily detected. As a result, the vehicle may continue to be operated in an increased fuel consumption mode rather than identifying the cause(s) of the increased fuel consumption.

BRIEF DESCRIPTION

In one embodiment, a method includes obtaining a measured amount of fuel consumed by an engine of a powered system and one or more corresponding operating parameters of the engine and determining a fuel consumption modeled amount based at least in part on a fuel consumption model of the engine and the one or more operating parameters of the engine. The fuel consumption model may associate different amounts of fuel that, when supplied to the engine, generate corresponding designated outputs of the engine. The method may include determining one or more differentials between the measured amount of fuel and the fuel consumption modeled amount and, responsive to the one or more of the differentials exceeding a threshold value, the method can include one or more of identifying one or more components of the powered system that contribute or cause the one or more differentials and/or changing an amount of fuel supplied to the engine according to the fuel consumption model to obtain a desired output of the engine.

In one embodiment, a system includes one or more processors configured to obtain a measured amount of fuel consumed by an engine of a powered system and one or more corresponding operating parameters of the engine. The one or more processors also are configured to determine a fuel consumption modeled amount based at least in part on a fuel consumption model of the engine and the one or more operating parameters of the engine. The fuel consumption model may associate different amounts of fuel that, when supplied to the engine, generate corresponding designated outputs of the engine. The one or more processors may determine one or more differentials between the measured amount of fuel and the fuel consumption modeled amount. The one or more processors may, responsive to the one or more of the differentials exceeding a threshold value, one or more of identify one or more components of the powered system that contribute or cause the one or more differentials and/or change an amount of fuel supplied to the engine according to the fuel consumption model to obtain a desired output of the engine.

In one embodiment, a system includes one or more processors that may determine how much fuel is consumed by an engine to provide a selected engine output and while operating under an operating condition. The one or more processors may determine a modeled amount of fuel that should have been consumed by the engine to produce the selected engine output while operating under the operating condition. The one or more processors may, based on a difference between how much fuel is consumed by the engine and the modeled amount of fuel, one or more of identify a component of a powered system that includes the engine for repair and/or change how much fuel is supplied to the engine.

BRIEF DESCRIPTION OF THE DRAWINGS

Reference is now made briefly to the accompanying drawings, in which.

DETAILED DESCRIPTION

One or more embodiments of the inventive subject matter described herein relate to systems and methods that monitor fuel usage of a powered system and that determine an expected fuel consumption of the powered system based on a fuel consumption model and operating parameters of the powered system. This model can be an off-board model that identifies how much fuel should be consumed by the powered system under different operating parameters. Alternatively, this model can be an onboard model that dictates how much fuel should be supplied to the powered system for obtaining a designated output of the powered system to obtain a designated output of the powered system.

In one example, the model can be referred to for calculating how much fuel should be supplied to an engine so that the engine produces the horsepower associated with a manually- or autonomously selected setting while the engine operates in conditions represented by the operating parameters. The model can be the input into an artificial intelligence (AI) controller that uses machine learning to predict how much fuel will be supplied or consumed by a vehicle. The controller can modify or update the model as parameters of the vehicle change, such as the health of the engine, the operating speed or torque of the engine, the engine temperature, the presence or developments of fuel leaks, etc.). For example, the controller can predict how much fuel will be consumed based on the model that assumes certain operating parameters of the vehicle. The controller can track or measure how much fuel is consumed, determine a difference between the predicted and actually consumed amounts of fuel, and then update the model so that the model would have been more accurate (with a smaller difference between predicted and actually consumed amounts of fuel) had the model previously been updated.

While one or more embodiments described herein relate to a vehicle as the powered system, not all embodiments of the inventive subject matter are limited to moving vehicles. One or more embodiments may relate to control the supply of fuel to engines in stationary powered systems, such as generators or other stationary power-generating systems. Optionally, one or more embodiments of the powered system relate to a multi-vehicle system formed from two or more propulsion-generating (and fuel-consuming) vehicles and, optionally, one or more non-propulsion-generating vehicles. The vehicles in the vehicle system may be mechanically coupled with each other (e.g., by couplers, by hitches, etc.) or may not be mechanically coupled with each other but can communicate with each other to coordinate the movements of the separate vehicles such that the vehicles move together in a vehicle system (e.g., as a convoy). The propulsion-generating vehicles can include rail vehicle (e.g., a locomotive), automobiles, trucks, mining vehicles, agricultural vehicles, marine vessels, aircraft, construction vehicle or equipment, and other off-highway vehicles. The non-propulsion-generating vehicles can include rail cars, trailers, barges, or the like. References herein to the vehicle can refer to a single vehicle of a single vehicle system (e.g., a vehicle system formed from a single vehicle only), a single vehicle of a multi-vehicle system (e.g., a vehicle system formed from two or more vehicles), and/or multiple (or all) vehicles in a multi-vehicle system.

The systems and methods can determine differences between the monitored amount of fuel consumption and the modeled amount of expected fuel consumption while the vehicle is moving. In one embodiment, one or more of these differences are used to identify a condition of the vehicle that is causing the difference in fuel consumption. For example, the systems and methods can pinpoint a condition of one or more vehicle components that may be causing the vehicle to consume more or less fuel than the vehicle should be consuming. The systems and methods can implement one or more actions in response to determining the difference(s). For example, the systems and methods can automatically activate an alarm (e.g., visual, audible, and/or tactile alarm), automatically schedule repair, inspection, replacement, or other maintenance of the vehicle or one or more components of the vehicle or perform another action. The systems and methods can restrict future operation of the vehicle (e.g., by reducing an upper limit on the throttle settings of the engine).

The systems and methods optionally can change the model to account for the differences. For example, the condition of the vehicle may result in a greater amount of fuel to be supplied to the engine under operating parameters than indicated by the model. The systems and methods can change the model so that, given the same operating parameters, the modified model indicates that more fuel is to be supplied to the engine to obtain a desired output than the model prior to modification. This modification can be a temporary change to the model.

With regard to the fuel, the fuel may be a single fuel type in one embodiment and in other embodiments the fuel may be a mixture of a plurality of different fuels. In one example of a fuel mixture a first fuel may be liquid and a second fuel may be gaseous. A suitable liquid fuel may be diesel (regular, biodiesel, HDRD, and the like), gasoline, kerosene, dimethyl ether (DME), alcohol, and the like. A suitable gaseous fuel may be natural gas (methane) or a short chain hydrocarbon, hydrogen, ammonia, and the like. In one embodiment, fuel may be inclusive of stored energy as used herein. In that perspective, a battery state of charge, or a source of compressed gas, a flywheel, fuel cell, and other types of non-traditional fuel sources may be included.

Figure 1:
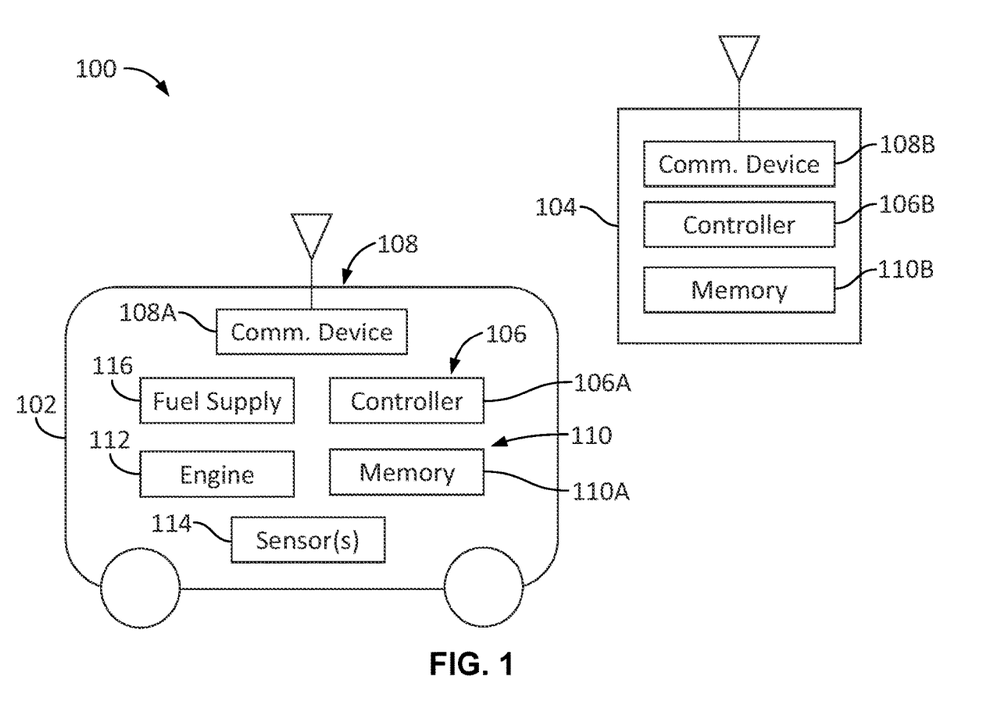
FIG. 1 illustrates one embodiment of a vehicle fuel control system.

FIG. 1 illustrates one embodiment of a vehicle fuel control system 100. The control system may be partially disposed onboard one or more vehicles 102 and an off-board monitoring facility 104, entirely onboard a vehicle, or entirely in the facility. The facility can represent a building, wayside device, or other structure, in which various components of the control system may be located.

The control system includes one or more controllers 106 (e.g., controllers 106A, 106B) that represent hardware circuitry connected with and/or including one or more processors (e.g., microprocessors, field programmable gate arrays, integrated circuits, etc.) that perform the operations associated with the controller(s). A controller is shown onboard the vehicle and in the facility—the description of the controller herein can apply to either or both these controllers. Communication devices 108 (e.g., communication devices 108A, 108B) represent transceiving circuitry that communicates with other communication devices. This circuitry can include modems, antennas, and the like, for wirelessly communicating between the vehicles, between the vehicle(s) and the facility, etc. Memories 110 (e.g., memories 110A, 110B) represent tangible and non-transitory computer-readable storage media, such as computer hard drives, removable computer drives, optical disks, USB memories, etc. The models described herein can be stored on one or more of the memories and/or communicated between the vehicles and/or facility via the communication devices.

With respect to the vehicle, an engine 112 receives fuel from a fuel supply 116. The engine can consume fuel to generate outputs, such as horsepower, that propels the vehicle. The fuel supply represents one or more devices that control the delivery of fuel to the engine, such as fuel injectors fluidly coupled with a fuel tank by conduits. The controller of the vehicle can control operation of the fuel injectors to vary how much fuel is supplied to the engine (e.g., such as to individual cylinders of the engine) to control how much output is generated by the engine.

Figure 2:
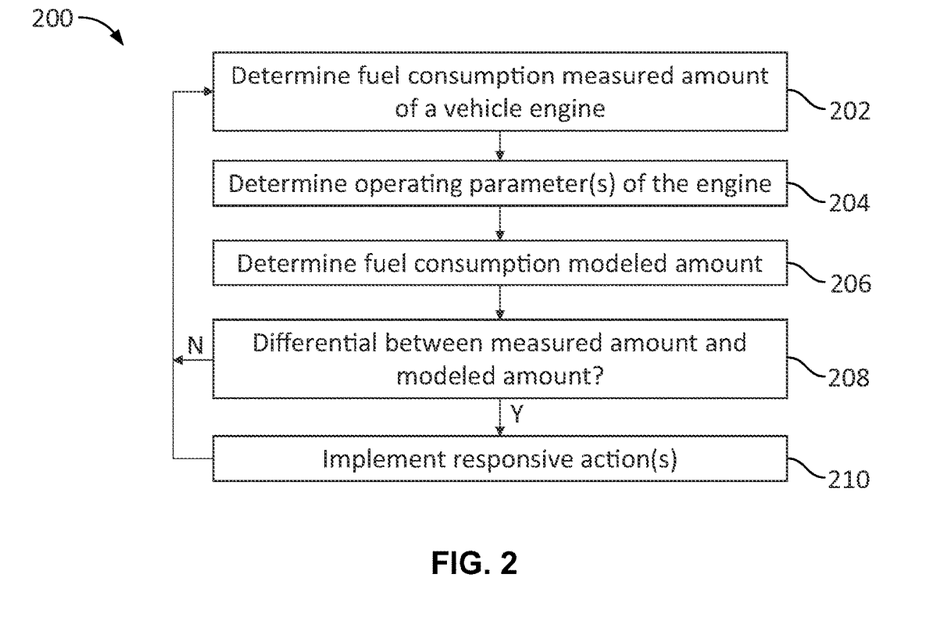
FIG. 2 illustrates a flowchart of one embodiment of a method for controlling the supply of fuel to a vehicle.

With continued reference to the fuel control system shown in FIG. 1, FIG. 2 illustrates a flowchart of one embodiment of a method 200 for controlling the supply of fuel to a vehicle. The method can represent operations performed by the control system. At step 202, fuel consumption of the vehicle engine is determined. This fuel consumption can be determined while the vehicle is moving. For example, the fuel consumption can be an instantaneous fuel consumption, which means the amount (e.g., volume, mass, etc.) of fuel that is supplied to the engine during the time period (e.g., a particular instant in time) that is substantially shorter than an entire trip of the vehicle. This time period, particular data snapshot, or data point time period may be less than one second and could be burst of data points. The fuel consumption can be determined by measuring the volume, mass, flow rate, or the like, at which fuel is supplied to one or more, or all, engine cylinders through fuel injectors Alternatively, the fuel consumption can be measured by one or more sensors 114, such as flow rate sensors.

At step 204, one or more operating parameters of the engine are determined. The operating parameters indicate one or more settings of the engine and/or vehicle and can represent one or more conditions in which the engine is operating. The controller can determine the operating parameters based on data output by the sensors and/or input provided by an operator of the vehicle. An operating parameter can be a desired output of the engine, which can be determined by or represented by a throttle setting of the engine, a desired or selected horsepower to be obtained from the engine, etc.

Another operating parameter can be a speed at which the engine is operating. The operating parameters can include a temperature of air or other fluids flowing in a manifold of the engine (e.g., a manifold air temperature) as measured by the sensors (e.g., a temperature sensor). The operating parameters can include an air-to-fuel ratio that is supplied to one or more cylinders of the engine (as measured by how long a fuel injector is open to deliver fuel to a cylinder and a sensor that measures air flow rate to the cylinder). The operating parameters can include pressure of coolant and/or lubricant (oil) in a cooling system or lubrication system of the vehicle (and as measured by pressure sensors). The operating parameters optionally can include ambient conditions, such as an ambient temperature, ambient pressure, humidity, etc., as measured by the sensors.

At step 206, a fuel consumption modeled amount is determined. The fuel consumption modeled amount is an amount of fuel that is expected to be supplied to the engine to obtain the desired output of the engine. This modeled amount is determined from one or more mathematical models of the engine that are stored in one or more of the memories. The model can associate different combinations of operating parameters with different modeled amounts of fuel consumption. For example, the model can be or represent one or more mathematical relationships between expected amounts of fuel consumption and different combinations of operating parameters and/or desired engine outputs. In one embodiment, the desired engine output and operating parameter(s) are input into the controller and the controller, using the model, calculates the expected fuel consumption. Alternatively, the model can be a list or table of different expected amounts of fuel consumption and different combinations of operating parameters and/or desired engine outputs. The controller can refer to the list or table to determine how much fuel is expected to be consumed.

For example, the model can indicate that a first amount of fuel should be consumed (e.g., is expected to be consumed) to obtain a desired engine output when the engine is operating under one or more (or all) of the following conditions: a first throttle setting, a first engine speed, a first manifold air temperature, a first air-to-fuel ratio, a first coolant pressure, a first oil pressure, a first ambient temperature, a first ambient pressure, and/or a first humidity. But, the model also can indicate that a different, second amount of fuel should be consumed (e.g., is expected to be consumed) to obtain the same desired engine output when the engine is operating under one or more different conditions (e.g., a different, second throttle setting, a different, second engine speed, a different, second manifold air temperature, a different, second air-to-fuel ratio, a different, second coolant pressure, a different, second oil pressure, a different, second ambient temperature, a different, second ambient pressure, and/or a different, second humidity). The model can indicate that a different, third amount of fuel should be consumed to obtain a different desired engine output when the engine is operating under the same operating conditions.

The model can be determined from prior measurements of fuel consumption of the vehicle or one or more other vehicles. For example, empirical data of how much fuel the same vehicle or another vehicle consumed while operating under various combinations of operating conditions to obtain various engine outputs may be measured from prior trips of the vehicle or other vehicles. With respect to other vehicles, this data can be collected for other vehicles in the same fleet and used to model the fuel consumption across many or all vehicles in the fleet.

At step 208, a determination is made as to whether the fuel consumption modeled amount differs from the fuel consumption measured amount. For example, the controller can determine that the engine consumed more fuel than expected to provide the desired output based on the model and the operating parameters. Alternatively, the controller can determine that the engine consumed less fuel than expected to provide the desired output based on the model and the operating parameters.

If the controller identifies such a difference, the difference can indicate that a condition of one or more components of the vehicle may be causing the engine to consume more or less fuel than expected. For example, a leak in one or more seals of the vehicle, an improperly assembled system of the vehicle, a broken or worn fan of the vehicle, etc., may be causing the engine to demand (and consume) more fuel than expected to produce the desired output. The difference can be detected by the controller responsive to the measured amount of fuel consumed exceeding or falling below the modeled amount of fuel consumed by any amount or by at least a threshold amount (e.g., at least 3% of the modeled amount, at least 5% of the modeled amount, or at least 10% of the modeled amount in some different examples of the systems and methods described herein). Optionally, the difference can be detected responsive to the difference being greater than a threshold amount.

In one example, the controller can determine whether any differential (between modeled and measured fuel consumption) exists in real time. For example, the controller can compare the modeled and measured amounts as the vehicle moves (and not after a trip of the vehicle is completed). The controller can detect the differences each time fuel is delivered to the engine, repeatedly but not each time fuel is delivered to the engine, at periodic or repeating times, at repeated but not periodic times (e.g., irregular or aperiodic times), or the like. Alternatively, the controller can determine whether any differential exists not in real time, but after completion of a trip of the vehicle is completed.

If a differential is identified, flow of the method can proceed toward step 210 for one or more responsive actions to be implemented. These responsive actions can be implemented to change or transform a state or mode of the vehicle. Alternatively, if a differential is not identified, then flow of the method can return toward step 202 to continue monitoring fuel consumption versus the modeled amount of fuel consumption. In another embodiment, flow of the method can terminate.

At step 210, one or more actions are implemented in response to detecting the differential between modeled and measured fuel consumption. In one example, the controller can identify one or more components of the vehicle that cause the fuel differential that is identified. The controller can examine the operating parameter(s) to pinpoint which vehicle component is in a condition that is causing the fuel consumed to increase above the modeled fuel consumption.

The memory can store data representative of relationships between operating parameters and vehicle components that are used by the controller to pinpoint which vehicle component may be causing the fuel consumption differential. These relationships can be modeled or measured from previous trips of the vehicle or other vehicles (e.g., in the same fleet). For example, different modeled amounts of fuel consumption can be associated (e.g., in the memory) with different designated operating parameters or combinations of designated operating parameters. If these designated operating parameters differ from the operating parameters detected in association with a measured fuel consumption (that differs from the modeled fuel consumption), then the controller can identify which component of the vehicle may be causing the fuel differential based on the operating parameter difference.

As one example, the controller can determine that a fuel injector, solenoid, pump, or switch of the fuel supply system needs inspection, repair, or replacement responsive to the fuel differential indicating that more fuel is being consumed that the modeled amount. The controller can determine that the fuel injector, solenoid, switch, or pump is remaining open or activated too long due to the measured amount of fuel consumed exceeding the modeled amount of fuel consumed. Or the controller can determine that the fuel injector, solenoid, switch, or pump is worn or remaining closed due to the measured amount of fuel consumed being less than the modeled amount of fuel consumed.

The controller can determine that a lubrication system of the vehicle is leaking, a cooling system of the vehicle is leaking, a power assembly or powertrain of the vehicle is faulty, and/or the fuel supply system of the vehicle is leaking (and causing or impacting fuel consumption) responsive to (a) a fuel differential being detected, (b) the engine speed being faster than the engine speed associated with the modeled amount of fuel consumption, (c) the air temperature in the engine manifold being within a designated range (e.g., within 3%, within 5%, within 10%, or within 20% according to different embodiments) of a manifold air temperature associated with the modeled amount of fuel consumption, and (d) the air-to-fuel ratio of the engine being smaller than a designated air-to-fuel ratio associated with the modeled amount of fuel consumption. As another example, the controller can determine that an air delivery system (e.g., that directs air into the engine and/or a cooling system) of the vehicle is leaking (and causing or impacting fuel consumption) responsive to the fuel differential being detected, the engine speed being within a designated range of the designated engine speed associated with the modeled amount of fuel consumption, the air temperature in the engine manifold being greater than the designated manifold air temperature associated with the modeled amount of fuel consumption, and the air-to-fuel ratio of the engine being smaller than the designated air-to-fuel ratio associated with the modeled amount of fuel consumption.

In yet another example, the controller can determine that the cooling system of the vehicle is faulty (e.g., a fan or blower is not generating enough airflow to cool components of the vehicle) and causing or impacting fuel consumption responsive to the fuel differential being detected, the air temperature in the engine manifold being greater than the designated manifold air temperature associated with the modeled amount of fuel consumption, the air-to-fuel ratio of the engine being greater than the designated air-to-fuel ratio associated with the modeled amount of fuel consumption, and the fuel pressure of the fuel supply system being within a designated range of a designated fuel pressure associated with the modeled amount of fuel consumption. As another example, the controller can determine that the fuel supply system of the vehicle is faulty and causing or impacting fuel consumption responsive to the fuel differential being detected, the air temperature in the engine manifold being greater than the designated manifold air temperature associated with the modeled amount of fuel consumption, and the fuel pressure of the fuel supply system being greater than the designated fuel pressure associated with the modeled amount of fuel consumption.

As another example, the controller can identify vehicles that are consuming more fuel than the model indicates that the vehicles should be consuming. For example, the controller can determine how much fuel each propulsion-generating vehicle in a multi-vehicle system should be consuming based on the model (which can be based on the grade, curvature, etc., of the route that a multi-vehicle system is traveling along; the weight, type, power capability, throttle setting, speed, etc., of the propulsion-generating vehicles in the multi-vehicle system; weather conditions such as wind direction, speed, precipitation, etc.; and the like). The controller can calculate the differential for each propulsion-generating vehicle in the vehicle system and compare the differentials that are determined. The vehicle(s) having the largest differential can be those propulsion-generating vehicles that are consuming more fuel than the model calculates the vehicles should be consuming (relative to one or more other propulsion-generating vehicles in the same vehicle system that are operating or otherwise consuming fuel to propel the vehicle system). The identified vehicle(s) can be treated as the component(s) that are identified, as described herein.

Responsive to identifying the component(s), the controller can implement or perform one or more responsive actions. As one example, the controller can automatically generate a warning to an operator of the vehicle (e.g., a visible light or display, a sound, etc.) and/or automatically send a signal via the communication device to the facility or another location. The warning can instruct the operator to check on the condition of the component that is identified. For example, the warning can instruct the operator to check for a lubricant or coolant leak. The signal can request the repair, inspection, or replacement of the identified component (e.g., once the vehicle arrives at the facility or location).

Optionally, the controller can automatically restrict operation of the vehicle. For example, the controller can place an upper limit on throttle settings, engine speeds, or the like, that is lower than a maximum throttle setting, engine speed, etc. This upper limit can prevent the vehicle operator from causing the vehicle from operating at throttle settings, engine speeds, etc. that exceed the upper limit (and potentially damage the identified or other vehicle components). This also can reduce an operating temperature of the vehicle (e.g., a manifold air temperature) that was detected. The controller optionally can automatically control the vehicle to limp home, such as by causing the vehicle to move to a repair location at a reduced throttle setting.

The controller may use the identified fuel differential to change how much fuel is subsequently supplied to the engine. The engine may not provide the desired output when operating in the detected operating parameters and when supplied with the modeled amount of fuel (for the desired output and detected operating parameters). Instead, the engine may produce a lesser output. For example, instead of providing a desired horsepower given current operating parameters and a modeled amount of fuel, the engine may provide a lesser amount of horsepower. The controller can detect and respond to such an output differential of the engine by changing how much fuel is supplied to the engine.

The controller can receive a request for an engine output from an operator of the vehicle (or from a plan that is used for automatic control of the vehicle) after previously identifying the fuel differential. The controller can refer to the fuel consumption model and determine the modeled amount of fuel to supply to the engine based on the operating parameters and requested engine output, as described above. Instead of controlling the fuel supply system to provide the engine with the modeled amount of fuel, however, the controller can use the previously identified fuel differential and direct the fuel supply system to provide more fuel to the engine (more than the modeled amount of fuel). This additional fuel can be referred to as a fuel boost above the modeled amount of fuel. This can ensure that the engine provides the requested engine output, even when one or more components of the vehicle are causing the engine to consume a different amount of fuel (than the modeled amount). The amount of the fuel boost can be based on previously identified fuel differentials. For example, the fuel boost can be equal to or proportional to one or more of the previously identified fuel differentials.

The controller can change a load distribution among the propulsion-generating vehicles in a multi-vehicle system based on and/or responsive to identifying the differential(s) from the model. The controller can identify the differential for each propulsion-generating vehicle in the multi-vehicle system (e.g., each propulsion-generating vehicle that is operating by consuming fuel to generate propulsion) and compare the differentials to each other. The controller can reduce the load placed on one or more of the propulsion-generating vehicles exhibiting larger differentials while increasing the load placed on one or more other propulsion-generating vehicles that are in the same vehicle system but that do not exhibit as large of differentials relative to the model. The controller can re-distribute the loads placed on the propulsion-generating vehicle to reduce the differentials to the model while also ensuring that the total load placed on all the propulsion-generating vehicles that are propelling the vehicle system is met by the propulsion-generating vehicles.

For example, the controller can determine that a total load is placed on three propulsion-generating vehicles A, B, and C in a multi-vehicle system to propel the vehicle system at a given speed (e.g., the route speed limit) due to the weight and/or size of the vehicle system. The controller can calculate differentials between the fuel consumed by each propulsion-generating vehicle and the modeled amount of fuel that should be consumed by each propulsion-generating vehicle. The vehicle A may be supplying 40% of the total horsepower to propel the vehicle system, while the vehicle B may be supplying 25% of the total needed horsepower, and vehicle C supplies 35% of the total needed horsepower. The relative loads (e.g., 40%, 25%, and 35%) provided by the vehicles A, B, C may or may not correlate with the amount of fuel consumed by each of the vehicles A, B, C. For example, vehicle A may be providing the most load of the three vehicles, but consuming less fuel than vehicle B or C. Instead of merely comparing the fuel consumed by the vehicles A, B, C with each other or merely comparing the loads on the vehicles A, B, C, with each other, the controller can determine, for each vehicle A, B, C, how much fuel the vehicle should be consuming (given the factors of the model, including the load placed on that vehicle) according to the model.

The controller can compare this modeled amount of fuel consumption with the actual amount of fuel consumed for each vehicle. The controller can decide to change the distributions of loads among the vehicles A, B, C based on these differentials. For example, if the vehicle B is consuming 30% more fuel than the model predicts the vehicle B should be consuming but the vehicle A is consuming only 5% more fuel than the model predicts for the vehicle A and the vehicle C is consuming 10% less fuel than the model predicts for the vehicle C, then the controller can re-distribute or re-allocate the loads among the vehicles A, B, C. The controller can re-distribute the loads by reducing the amount of load placed on the vehicle A, increasing the load placed on the vehicle C, and changing or keeping the load placed on the vehicle B. Reducing the load placed on the vehicle A may cause the vehicle A to consume less fuel or otherwise consume an amount of fuel that is closer to the modeled amount of fuel consumption for the vehicle A. Increasing the load placed on the vehicle C may cause the vehicle C to consume more fuel or otherwise consume an amount of fuel that is closer to the modeled amount of fuel consumption for the vehicle B. The loads may be re-distributed or re-allocated such that the vehicle A is producing 30% of the horsepower (reduced from 40%), the vehicle B is producing 35% of the horsepower (increased from 25%), and the vehicle C is producing 35% of the horsepower. The controller can re-distribute the loads such that the individual load placed on two or more of the vehicles may change, but the total load provided by the vehicles remains the same. The controller can repeatedly compare the modeled amounts of fuel consumption and the actual amounts of fuel consumed by the vehicles and repeatedly re-distribute or re-allocate the loads placed on the vehicles. This process can keep the actual fuel consumed by the vehicle system to be closer to, and remain closer to, the model than if the controller did not repeatedly calculate the model differentials and repeatedly re-distribute the loads based on the model differentials.

In some situations, the controller may re-distribute the loads among the vehicles to bring the actual amounts of fuel consumed by each of the vehicles closer to the modeled amounts, but still not reach the modeled amounts. In continuing with the preceding example, the vehicle A may be producing 40% of the total load placed on the vehicle system, the vehicle B may be producing 25% of the total load placed on the vehicle system, and the vehicle C may be producing 35% of the total load placed on the vehicle system. But all three of the vehicles A, B, and C may be consuming more fuel than the modeled amount for the respective vehicle. The controller can examine the differentials for each vehicle and re-allocate the total load among the vehicles to reduce one or more of the differentials and/or to reduce the total differential. With respect to reducing one or more of the differentials, the controller can re-allocate the loads among the vehicles to that the differential(s) are decreased.

In one example, the controller can re-allocate the loads among the vehicles to reduce the largest differential of the differentials calculated for the vehicles. Stated differently, if vehicle A is associated with the largest differential, then the loads can be re-allocated so that vehicle B and vehicle C may have larger differentials but that the differential of vehicle A is reduced. As another example, the controller can re-allocate the loads among the vehicles to reduce the total differentials. The controller can add up or calculate the sum of the differentials of the vehicles and then change the load placed onto each vehicle (while still meeting the overall or total load on the vehicle system) so that the sum of the newly calculated differentials is decreased. For example, after re-allocating the loads, the controller can re-calculate the differentials and the sum of these re-calculated differentials may be smaller (than prior to re-allocating the loads among the vehicles). The differential for one or more of the vehicles may increase, but the sum or total of the differentials may decrease.

The loads of the vehicle system and/or each individual propulsion-generating vehicle can be obtained from a software application or system that is operating on or that is controlling operation of the controller. For example, an energy management system such as the TRIP OPTIMIZER software application or system may be used to determine and/or re-allocate the loads. TRIP OPTIMIZER software is commercially available from Wabtec Corporation.

In one embodiment, the controller can re-allocate the total load among the vehicles to reduce one or more of the differentials from the model without isolating, deactivating, or otherwise turning off any of the vehicles. For example, the controller can reduce the portion of the total load that is placed onto vehicle B without placing the vehicle B or engine into idle or an idle state, without cutting out the vehicle B, without isolating the vehicle B, or without otherwise turning off the vehicle B or the engine of vehicle B.

Over time, the controller may adjust the model. The model may be adjusted due to aging and/or usage of vehicle components. For example, as the components age and/or are used more, the modeled amounts of fuel consumed may change (for the same operating parameters). The model can be modified to account for the components not operating as efficiently as before when the components were newer and/or less worn.

The controller can change the modeled fuel amounts based on one or more fuel differentials. For example, as the controller identifies more and more fuel differentials, the controller can change the model to reduce or eliminate future fuel differentials from being identified. This can allow for the model to be updated to account for aging of the vehicle and/or vehicle components. Larger fuel differentials may still be used to pinpoint vehicle components needing repair, inspection, or replacement, but the model can be updated to ensure that components are not falsely identified as having failed.

In one embodiment, the model for one vehicle can be modified based on performance metrics of other vehicles. For example, the vehicle may be part of a fleet of vehicles of the same model, made by the same manufacturer, etc. Fuel differentials identified within this fleet of vehicles may be performance metrics that are used to modify the model of other vehicles, even if the other vehicles are not yet exhibiting the fuel differentials. The outputs of the engines of these vehicles in the fleet also may be performance metrics that are used to modify the model for the vehicle. Another example of a performance metric includes weather conditions. Certain weather conditions can impact how efficiently or inefficiently vehicles consume fuel. For example, vehicles operating in cold environments, vehicles moving into a headwind, vehicles operating in higher altitudes, and the like, may consume more fuel and, accordingly, have larger model differentials than for other vehicles (operating in warmer environments, moving with a tailwind, etc.). The controller can change the model to account for these environmental or weather impacts on the vehicles. For example, the modeled fuel consumption for vehicles operating in colder areas, with headwinds, in higher altitudes, etc., can be increased relative to vehicles operating in warmer areas, with weaker or no headwinds, in lower altitudes, and the like.

After one or more components of the vehicle being identified as being in a condition causing the fuel differential to exist, the controller may automatically control operation of the vehicle to determine whether the condition has changed. For example, after identifying a fuel differential, one or more components identified using the fuel differential can be repaired, replaced, or otherwise maintained. The controller can then automatically control the vehicle to operate according to a prescribed set of the operating parameters. These operating parameters can be the same as or otherwise based on the operating parameters associated with the fuel differential. For example, the controller can automatically control the vehicle to mimic the conditions in which the fuel differential was identified. This can occur within a repair facility (e.g., a shop), while the vehicle is moving, or in another location. The controller can again determine whether there is a fuel differential. If the differential is identified, then the controller can optionally warn an operator and can determine whether the same or other components may be at fault for causing the fuel differential. This process can ensure that all components associated with causing the fuel differential are identified. For example, the impact of one component on the fuel differential may mask or otherwise hide the impact of another component. By mimicking the conditions in which the fuel differential was first identified, the controller can determine if other components are also contributing to causing the fuel differential.

As another example of a responsive action, the controller can change a route being traveled by the vehicle. Responsive to detecting a fuel differential and the operating parameters associated with the fuel differential, the controller can change where the vehicle is traveling to change or reduce the operating parameters. For example, the manifold air temperature associated with a fuel differential may be hotter than a designated temperature. The controller can automatically control the vehicle (or direct an operator) to move the vehicle to an area where the ambient temperature is cooler. As another example, the manifold air temperature associated with a fuel differential may be cooler than a designated temperature. The controller can automatically control the vehicle (or direct an operator) to move the vehicle to an area where the ambient temperature is warmer. As another example, the air-to-fuel ratio associated with a fuel differential may be smaller than a designated temperature. The controller can automatically control the vehicle (or direct an operator) to move the vehicle to an area where there is more oxygen (e.g., outside of an airflow restricted area such as a tunnel, valley, or urban area). The controller can control movement of the vehicle by controlling a steering mechanism of the vehicle, by sending a signal to a wayside device (e.g., a gate, a switch at an intersection of routes, etc.) to cause the device to change which route is traveled by the vehicle.

The onboard or off-board controller optionally can organize or dictate where fuel is stored on the vehicles or on non-propulsion-generating vehicles that are transporting the fuel based on storage costs. The controller can examine where different vehicles that transport fuel are moving and can direct the vehicles to travel to and remain in locations having lower government taxes on fuel storage (relative to other locations). For example, if a propulsion-generating vehicle is pulling a non-propulsion-generating vehicle that is transporting fuel for storage through a first territory and then into a second territory, the controller can examine fuel storage costs and taxes of the first territory and the second territory. If the fuel can be stored in either territory, the controller can direct or control the propulsion-generating vehicle to take the non-propulsion-generating vehicle to the territory with the lower storage costs and/or taxes for storage.

The decision of whether to store fuel and/or where to store fuel also can be based on the model. For example, the controller can predict how much fuel will be consumed by a vehicle system to transport the vehicle system and fuel carried by the vehicle system to different storage locations (e.g., different vehicle yards or rail yards, storage facilities, or the like). The controller can calculate transportation costs as the costs of the fuel that would be consumed to transport the fuel to the different storage locations (e.g., using operator input fuel prices, fuel prices communicated to the controller from another source, default fuel prices, etc.). Based on this information and the different costs for storing fuel at the different locations, the controller can decide whether to control the vehicle system to move to one storage location instead of other storage locations for storing the fuel. For example, the cost to fuel the vehicle system to a first storage location may be more expensive than to a different, second storage location, but the costs to store the fuel at the second storage location may be more expensive such that the total cost to transport and store the fuel at the first location is less costly than transporting and storing the fuel at the second location.

The controller can use the model of fuel consumption to predict when and/or where to notify a vehicle (e.g., a vehicle operator) and/or automatically control the vehicle that additional fuel is needed. For example, the controller can refer to the model to determine how much fuel and/or the rate at which the vehicle will consume fuel. The predicted amount of remaining fuel can vary based on engine parameters, such as the torque output by the engine, the throttle setting of the engine, the temperature of the engine, etc. Greater torques, higher throttle settings, and/or hotter engines may be associated with increased fuel consumption in the model, while smaller torques, lower throttle settings, and/or cooler engines may be associated with decreased fuel consumption. The controller can examine the parameters of the engine as the vehicle is traveling and update the model using these parameters to predict how far the vehicle can continue traveling.

The controller can compare the predicted amount and/or rate of fuel consumption with the current amount of fuel stored onboard the vehicle. From this information, the controller can predict when and/or where the vehicle will have different amounts of remaining fuel. The controller can notify the operator and/or control the vehicle based on this information. For example, the vehicle may be approaching a refueling location in fifty kilometers but may have enough fuel for the vehicle to trave two hundred kilometers. But the controller may use the model to predict that the vehicle will only be able to continue operating for one hundred fifty kilometers due to the predicted rate and/or amount at which the vehicle will likely consume fuel (and there is no other refueling location after the refueling location and before the vehicle is predicted to run out of fuel according to the model). The controller can refer to a map or route database (e.g., stored in either memory) to determine where available refueling locations are. Based on the predicted distance that the vehicle can continue operating and the refueling locations, the controller can direct or automatically control the vehicle to travel to a refueling location to refuel, even if the refueling location is far ahead of the distance that the vehicle can travel based on the model and the current amount of fuel.

Over time, the vehicle may require maintenance, repair, or replacement of one or more components. The costs for repairing components can vary due to supply issues, availability of personnel to perform the maintenance, repair, or replacement, or the like. Fuel costs also vary with respect to time. Therefore, both repair costs (e.g., costs for maintenance, repair, or replacement of a component) and fuel costs can be dynamic. The controller can examine or estimate these dynamic costs to determine whether to continue operating the vehicle or to stop the vehicle for repairs. For example, the controller may determine that a fuel injector or a fuel conduit of the vehicle is leaking fuel, a seal in the fuel system of the vehicle has failed, or the like. The model can be updated by the controller to reflect the fuel loss (a type of fuel consumption even though the fuel is not actually consumed by the engine but is otherwise lost and unavailable for the engine to consume) caused by the faulty or damaged component of the vehicle. The controller can determine (e.g., from costs stored in the memory, from signals communicated to the controller from a repair facility, from information input by an operator, etc.) the costs of repairing the issue (e.g., the cause of the fuel leak). The controller can compare the cost of repair versus the cost of additional fuel consumption caused by the leak. If the cost of repair is greater than the cost of additional fuel consumption, then the controller can direct the vehicle to continue operating even with the fuel leak (unless the fuel leak poses an unsafe condition for passengers and/or the vehicle). But, if the cost of repair is less than the cost of additional fuel consumption, then the controller can direct the vehicle to stop at a repair facility to fix the cause of the leak.

In one embodiment, a method includes obtaining a measured amount of fuel consumed by an engine of a powered system and one or more corresponding operating parameters of the engine and determining a fuel consumption modeled amount based at least in part on a fuel consumption model of the engine and the one or more operating parameters of the engine. The fuel consumption model associates different amounts of fuel that, when supplied to the engine, generate corresponding designated outputs of the engine. The method also can include determining one or more differentials between the measured amount of fuel and the fuel consumption modeled amount and, responsive to the one or more of the differentials exceeding a threshold value, the method can include one or more of: identifying one or more components of the powered system that contribute or cause the one or more differentials and/or changing an amount of fuel supplied to the engine according to the fuel consumption model to obtain a desired output of the engine.

Optionally, the method includes identifying the one or more components for one or more of repair, inspection, or replacement based on the one or more differentials and one or more of the operating parameters. Optionally, the method also can include modifying the fuel consumption model based at least in part on one or more of age engine, age of a fuel supply system of the powered system, or usage of the engine. Optionally, the powered system is a vehicle, and the method also can include modifying the fuel consumption model based at least in part on performance metrics of a fleet of vehicles that include a vehicle housing the engine. Optionally, the method also can include, responsive to the one or more differentials exceeding a corresponding designated threshold value, directing the engine to operate according to a prescribed set of the operating parameters to replicate the operating parameters that were used when the measured amount of fuel consumed differed from the fuel consumption modeled amount, determining additional fuel consumption by the engine while operating according to the prescribed set of the operating parameters, and determining whether a differential between the additional fuel consumption and the fuel consumption modeled amount exceeds the threshold value.

Optionally, the method may include generating a notification signal responsive to the one or more differentials exceeding the threshold value. Optionally, the method also can include scheduling one or more of repair, maintenance, or inspection of the engine responsive to the one or more differentials exceeding the threshold value. Optionally, the method may include one or more of scheduling for movement or moving a vehicle that includes the engine to a designated location responsive to the one or more differentials exceeding the threshold value. Optionally, the method may include changing an operation in addition to changing how much fuel is supplied to the engine in response to determining that one or more of the differentials exceeds the threshold value. Optionally, the powered system is an automobile, a marine vessel, a rail vehicle, mining equipment, construction equipment, agricultural equipment, or an aircraft.

In one embodiment, a system includes one or more processors that may obtain a measured amount of fuel consumed by an engine of a powered system and one or more corresponding operating parameters of the engine. The one or more processors also may determine a fuel consumption modeled amount based at least in part on a fuel consumption model of the engine and the one or more operating parameters of the engine. The fuel consumption model associates different amounts of fuel that, when supplied to the engine, generate corresponding designated outputs of the engine. The one or more processors also may determine one or more differentials between the measured amount of fuel and the fuel consumption modeled amount. The one or more processors may, responsive to the one or more of the differentials exceeding a threshold value, one or more of identify one or more components of the powered system that contribute or cause the one or more differentials and/or change an amount of fuel supplied to the engine according to the fuel consumption model to obtain a desired output of the engine.

Optionally, the one or more processors also may identify the one or more components for one or more of repair, inspection, or replacement based on the one or more differentials and one or more of the operating parameters.

Optionally, the one or more processors may modify the fuel consumption model based at least in part on one or more of age engine, age of a fuel supply system of the powered system, or usage of the engine. Optionally, the powered system is a vehicle, and the one or more processors may modify the fuel consumption model based at least in part on performance metrics of a fleet of vehicles that include a vehicle housing the engine. Optionally, the one or more processors may, responsive to the one or more differentials exceeding a corresponding designated threshold value, direct the engine to operate according to a prescribed set of the operating parameters to replicate the operating parameters that were used when the measured amount of fuel consumed differed from the fuel consumption modeled amount, determine additional fuel consumption by the engine while operating according to the prescribed set of the operating parameters, and determine whether a differential between the additional fuel consumption and the fuel consumption modeled amount exceeds the threshold value.

In one embodiment, a system includes one or more processors that may determine how much fuel is consumed by an engine to provide a selected engine output and while operating under an operating condition. The one or more processors may determine a modeled amount of fuel that should have been consumed by the engine to produce the selected engine output while operating under the operating condition. The one or more processors also may, based on a difference between how much fuel is consumed by the engine and the modeled amount of fuel, one or more of identify a component of a powered system that includes the engine for repair and/or change how much fuel is supplied to the engine.

Optionally, the one or more processors also may change an operation of the powered system in addition to changing how much fuel is supplied to the engine based on the difference between how much fuel is consumed and the modeled amount of fuel. Optionally, the operation that is changed includes reducing an operating temperature of the powered system that includes the engine. Optionally, the operation that is changed includes changing a route being traveled by a vehicle that includes the engine. Optionally, the operation that is changed includes changing a state of a switch at an intersection between routes so that a vehicle that includes the engine moves from a first route to a second route.

This written description uses examples to disclose several embodiments of the inventive subject matter and to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitries. Thus, for example, one or more of the functional blocks (for example, processors or memories) may be implemented in a single piece of hardware (for example, a general-purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A method comprising:
calculating modeled amounts of fuel predicted to be consumed by a plurality of propulsion-generating vehicles in a multi-vehicle system, wherein the modeled amounts of fuel are calculated using a fuel consumption model that associates different values of the modeled amounts of fuel with operating parameters of the plurality of propulsion-generating vehicles;
measuring consumed amounts of fuel that are consumed by each of the plurality of propulsion-generating vehicles;
calculating difference values between the modeled amounts of fuel and the consumed amounts of fuel for each of the plurality of propulsion-generating vehicles in the multi-vehicle system; and
re-allocating loads placed on each of the plurality of propulsion-generating vehicles based on the difference values of each of the plurality of propulsion-generating vehicles in the multi-vehicle system;
determining the consumed amounts of fuel after re-allocating the loads among the plurality of propulsion-generating vehicles; and
re-calculating the difference values between the modeled amounts of fuel and the consumed amounts of fuel after re-allocating the loads among the plurality of propulsion-generating vehicles, wherein the difference values are smaller after re-allocating the loads among the plurality of propulsion-generating vehicles compared to prior to re-allocating the loads among the plurality of propulsion-generating vehicles, wherein at least a portion of the load is re-allocated from a first propulsion-generating vehicle with larger difference values to at least a second propulsion-generating vehicle with smaller difference values.

2. The method of claim 1, wherein re-calculating the difference values comprises:
re-calculating the modeled amounts of fuel after re-allocating the loads among the plurality of propulsion-generating vehicles;
re-measuring the consumed amounts of fuel after re-allocating the loads among the plurality of propulsion-generating vehicles; and
re-calculating the difference values between the modeled amounts of fuel and the consumed amounts of fuel after re-allocating the loads among the plurality of propulsion-generating vehicles, wherein the difference values are smaller after re-allocating the loads among the plurality of propulsion-generating vehicles compared to prior to re-allocating the loads among the plurality of propulsion-generating vehicles.

3. The method of claim 1, wherein re-allocating the loads includes changing amounts of horsepower output by the plurality of propulsion-generating vehicles.

4. The method of claim 1, wherein the loads are re-allocated among the plurality of propulsion-generating vehicles while a total load placed on the plurality of propulsion-generating vehicles continues to be met by the plurality of propulsion-generating vehicles after re-allocating the loads.

5. The method of claim 1, wherein the loads are re-allocated among the plurality of propulsion-generating vehicles without deactivating, turning off, isolating, or cutting out any of the plurality of propulsion-generating vehicles.

6. The method of claim 1, further comprising identifying one or more components of at least one of the plurality of propulsion-generating vehicles for repair, inspection, or replacement based on one or more of the difference values, wherein the one or more components contributes to the consumed amounts of fuel by the at least one of the propulsion-generating vehicles.

7. The method of claim 1, further comprising modifying the fuel consumption model based at least in part on performance metrics of a fleet of the plurality of propulsion-generating vehicles.

8. The method of claim 1, further comprising:
determining fuel storage costs indicative of costs for storing fuel at two or more different locations;
calculating transportation costs for transporting the fuel from a current location of the multi-vehicle system to the different locations, the transportation costs are calculated using the fuel consumption model;
selecting one of the different locations for storing the fuel based on the fuel storage costs and the transportation costs associated with the different locations; and
controlling or sending instructions to move the multi-vehicle system to the one of the different locations that is selected for storage of the fuel.

9. The method of claim 1, further comprising:
calculating an amount of fuel to be consumed by continued movement of the multi-vehicle system using the fuel consumption model;
comparing the amount of fuel calculated to be consumed with an amount of fuel carried by the multi-vehicle system; and
generating an alert to an operator of the multi-vehicle system based on the amount of fuel that is calculated to be consumed and the amount of fuel carried by the multi-vehicle system.

10. The method of claim 1, further comprising:
determining a repair cost for a component of the multi-vehicle system;
calculating a fuel cost of continuing to operate the multi-vehicle system without repairing the component, wherein the fuel cost is calculated using the fuel consumption model; and
directing the multi-vehicle system to a repair facility for repair of the component or to continue moving without repairing the component based on a comparison between the repair cost and the fuel cost.

11. A system comprising:

a plurality of propulsion-generating vehicles in a vehicle system, wherein the plurality of propulsion-generating vehicles comprise engines or fuel cells;

a control device communicably coupled with the plurality of propulsion-generating vehicles in a vehicle system;

the control device configured to:

calculate modeled amounts of fuel predicted to be consumed by engines or fuel cells of the plurality of propulsion-generating vehicles in the multi-vehicle system, the modeled amounts of fuel calculated using a fuel consumption model that associates different values of the modeled amounts of fuel with operating parameters of the engines or fuel cells;

determine consumed amounts of fuel that are consumed by the engines or fuel cells of the plurality of propulsion-generating vehicles;

calculate difference values between the modeled amounts of fuel and the consumed amounts of fuel for each of the plurality of propulsion-generating vehicles;

re-allocate loads placed on the plurality of propulsion-generating vehicles based on the difference values of each of the plurality of propulsion-generating vehicles in the multi-vehicle system;

determine the consumed amounts of fuel after re-allocating the loads among the plurality of propulsion-generating vehicles; and re-calculate the difference values between the modeled amounts of fuel and the consumed amounts of fuel after re-allocating the loads among the plurality of propulsion-generating vehicles, wherein the difference values are smaller after re-allocating the loads among the plurality of propulsion-generating vehicles compared to prior to re-allocating the loads among the plurality of propulsion-generating vehicles, wherein at least a portion of the load is re-allocated from a first propulsion-generating vehicle with larger difference values to at least a second propulsion-generating vehicle with smaller difference values.

12. The system of claim 11, wherein the control device is configured to re-allocate the loads by changing amounts of horsepower output by the plurality of propulsion-generating vehicles.

13. The system of claim 11, wherein the control device is configured to re-allocate the loads among the plurality of propulsion-generating vehicles while a total load placed on the plurality of propulsion-generating vehicles continues to be met by the plurality of propulsion-generating vehicles after re-allocating the loads.

14. The system of claim 11, wherein the control device is configured to re-allocate the loads among the plurality of propulsion-generating vehicles without deactivating, turning off, isolating, or cutting out any of the plurality of propulsion-generating vehicles.

15. The system of claim 11, wherein the control device is configured to identify one or more components of at least one of the plurality of propulsion-generating vehicles for repair, inspection, or replacement based on one or more of the difference values.

16. The system of claim 15, wherein the one or more components include an engine component or a fuel cell component.

17. The system of claim 11, wherein the control device is further configured to:

determine fuel storage costs indicative of costs for storing fuel at two or more different locations;

calculate transportation costs for transporting the fuel from a current location of the multi-vehicle system to the different locations, wherein the transportation costs are calculated using the fuel consumption model;

select one of the different locations for storing the fuel based on the fuel storage costs and the transportation costs associated with the different locations; and control or send instructions to move the multi-vehicle system to the one of the different locations that is selected for storage of the fuel.

18. The system of claim 11, wherein the control device is further configured to modify the fuel consumption model based at least in part on performance metrics of a fleet of the plurality of propulsion-generating vehicles.

19. The system of claim 11, wherein the control device is further configured to:

determine a repair cost for a component of the multi-vehicle system;

calculate a fuel cost of continuing to operate the multi-vehicle system without repairing the component, wherein the fuel cost is calculated using the fuel consumption model; and direct the multi-vehicle system to a repair facility for repair of the component or to continue moving without repairing the component based on a comparison between the repair cost and the fuel cost.

* * * * *